United States Patent

Bos et al.

(10) Patent No.: US 11,410,078 B2
(45) Date of Patent: Aug. 9, 2022

(54) METHOD AND DATA PROCESSING SYSTEM FOR MAKING MACHINE LEARNING MODEL MORE RESISTENT TO ADVERSARIAL EXAMPLES

(71) Applicant: NXP B.V., Eindhoven (NL)

(72) Inventors: Joppe Willem Bos, Wijgmaal (BE); Simon Johann Friedberger, Heverlee (BE); Christiaan Kuipers, Eindhoven (NL); Vincent Verneuil, Hamburg (DE); Nikita Veshchikov, Brussels (BE); Christine Van Vredendaal, Eindhoven (NL); Brian Ermans, 's-Hertogenbosch (NL)

(73) Assignee: NXP B.V., Eindhoven (NL)

( * ) Notice: Subject to any disclaimer, the term of this patent is extended or adjusted under 35 U.S.C. 154(b) by 437 days.

(21) Appl. No.: 16/297,955

(22) Filed: Mar. 11, 2019

(65) Prior Publication Data

US 2020/0293941 A1 Sep. 17, 2020

(51) Int. Cl.
*G06N 20/00* (2019.01)
*H04L 9/08* (2006.01)
*H04L 9/32* (2006.01)

(52) U.S. Cl.
CPC ............ *G06N 20/00* (2019.01); *H04L 9/0869* (2013.01); *H04L 9/3242* (2013.01)

(58) Field of Classification Search
CPC ...... G06N 20/00; H04L 9/0869; H04L 9/3242
USPC ........................................................ 713/189
See application file for complete search history.

(56) References Cited

U.S. PATENT DOCUMENTS

| | | | |
|---|---|---|---|
| 5,608,801 A | 3/1997 | Aiello et al. | |
| 6,275,544 B1 * | 8/2001 | Aiello | H04L 27/066 |
| | | | 375/326 |
| 6,501,874 B1 * | 12/2002 | Frolov | G02B 6/278 |
| | | | 385/27 |
| 7,571,199 B1 * | 8/2009 | Field | G06F 7/58 |
| | | | 708/250 |
| 9,734,703 B1 * | 8/2017 | Chhabra | H03M 1/0643 |
| 9,852,496 B2 * | 12/2017 | Marchand | G06T 5/003 |
| 2008/0292203 A1 * | 11/2008 | Park | G09G 3/2048 |
| | | | 382/266 |
| 2012/0203522 A1 * | 8/2012 | Kinsella | G06F 30/23 |
| | | | 703/2 |

(Continued)

OTHER PUBLICATIONS

K. Eykholt et al., "Robust Physical-World Attacks on Deep Learning Visual Classification," 2018 IEEE/CVF Conference on Computer Vision and Pattern Recognition, 2018, pp. 1625-1634, doi: 10.1109/CVPR.2018.00175. (Year: 2017).*

(Continued)

*Primary Examiner* — Kambiz Zand
*Assistant Examiner* — Aubrey H Wyszynski
(74) *Attorney, Agent, or Firm* — Daniel D. Hill

(57) ABSTRACT

A method and data processing system for making a machine learning model more resistant to adversarial examples are provided. In the method, an input for a machine learning model is provided. A randomly generated mask is added to the input to produce a modified input. The modified input is provided to the machine learning model. The randomly generated mask negates the effect of a perturbation added to the input for causing the input to be an adversarial example. The method may be implemented using the data processing system.

9 Claims, 3 Drawing Sheets

(56) References Cited

U.S. PATENT DOCUMENTS

| | | | | |
|---|---|---|---|---|
| 2013/0120390 | A1* | 5/2013 | Marchand | G06T 5/006 345/428 |
| 2014/0214911 | A1* | 7/2014 | Rao | G06F 17/16 708/208 |
| 2015/0263854 | A1* | 9/2015 | Sakumoto | H04L 9/0869 380/44 |
| 2017/0304732 | A1* | 10/2017 | Velic | G06K 9/6256 |
| 2018/0183576 | A1* | 6/2018 | Wang | H04L 9/0631 |
| 2019/0172230 | A1* | 6/2019 | Mailhe | G06N 3/006 |
| 2020/0193609 | A1* | 6/2020 | Dharur | G06N 3/0472 |

OTHER PUBLICATIONS

Ian Goodfellow, Patrick McDaniel, Nicolas Papernot. "Making Machine Learning Robust Against Adversarial Inputs" Communications of the ACM, Jul. 2018, vol. 61 No. 7, pp. 56-66. 10.1145/3134599 (Year: 2018).*

Biggio, Battista et al.; "Evasion Attacks Against Machine Learning at Test Time;" Machine Learning and Knowledge Discovery in Databases—European Conference, ECML PKDD 2013, Prague, Czech Republic, Sep. 23-27, 2013, Proceedings, Part III; Sep. 23-27, 2013; pp. 387-402; DOI: 10.1007/978-3-642-40994-3_25.

Szegedy, Christian et al.; "Intriguing Properties of Neural Networks;" arXiv:1312.6199v4; CoRR abs/1312.6199 (2014).

Guo, Chuan et al.; "Countering Adversarial Images Using Input Transformations;" arXiv:1711.00117v3; CoRR abs/1711.00117 (2018).

Goodfellow, Ian J. et al.; "Explaining and Harnessing Adversarial Examples;" arXiv:1412.6572v3; CoRR abs/1412.6572 (2015).

Eykholt, Kevin et al.; "Robust Physical-World Attacks on Deep Learning Models;" arXiv.org > cs > arXiv:1707.08945; Submitted on Jul. 27, 2017, last revised Apr. 10, 2018.

Sethi, Tegjyot Singh et al.; "Security Theater: On the Vulnerability of Classifiers to Exploratory Attacks;" arXiv.org > cs > arXiv:1803.09163; Submitted on Mar. 24, 2018; DOI: 10.1007/978-3-319-57463-9_4.

* cited by examiner

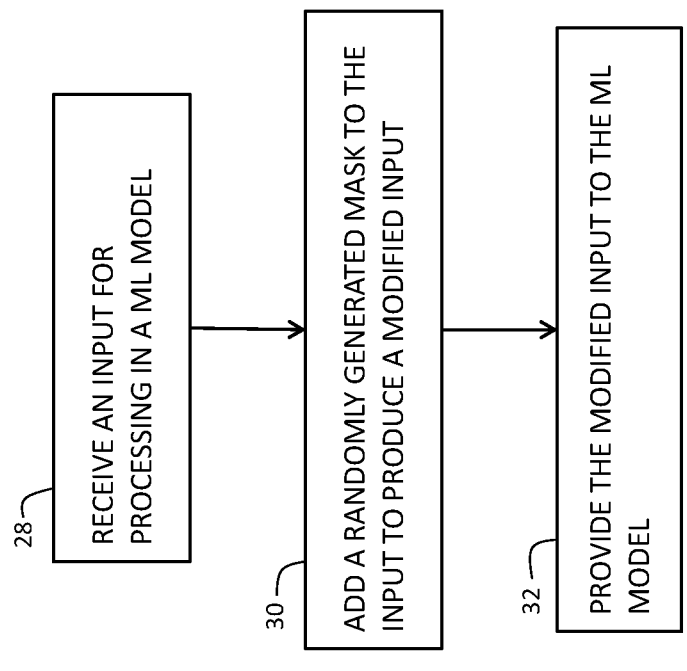

METHOD AND DATA PROCESSING SYSTEM FOR MAKING MACHINE LEARNING MODEL MORE RESISTENT TO ADVERSARIAL EXAMPLES

BACKGROUND

Field

This disclosure relates generally to machine learning, and more particularly, to a method and data processing system for making a machine learning model more resistant to adversarial examples.

Related Art

Machine learning is a technique that enables a wide range of applications such as forecasting and classification. Typically, a trained machine learning (ML) model receives an input and computes an output that corresponds to the required classification or prediction.

The safety and security of ML models is becoming a significant consideration. In one example, an attacker may illegitimately change what a machine learning model will output in response to certain input values. These input values are formed by the attacker by applying small but intentionally worst-case perturbations to inputs so that the perturbed input results in the ML model outputting an incorrect answer with high confidence. These input perturbations are sometimes referred to as adversarial examples. In this way, a model can be fooled into providing outputs that affect, for example, personal safety, security, and privacy. For example, an attacker may create a modified input that causes a machine learning model in a driverless car to misclassify a road sign. It would be desirable to have a relatively straightforward method to counter or diminish the threat of adversarial examples without having to modify or re-train the ML model.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates a method for making a machine learning model more resistant to adversarial examples in accordance with an embodiment.

DETAILED DESCRIPTION

Figure 1:
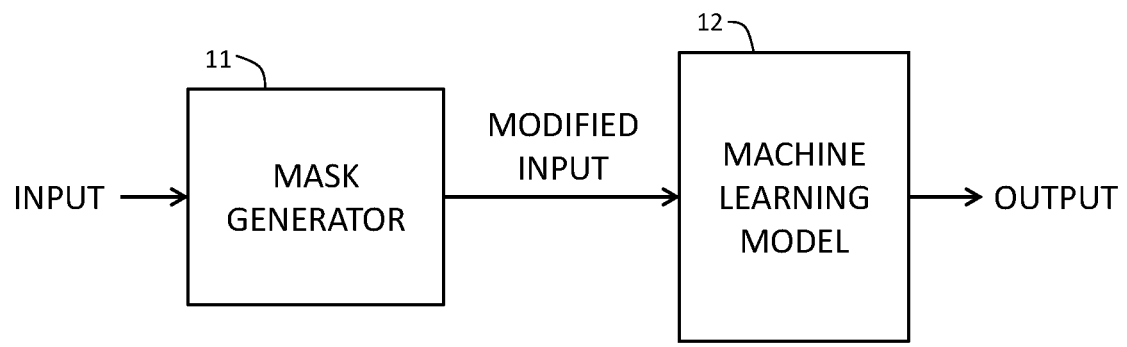
FIG. 1 illustrates a mask generator and a machine learning model in accordance with an embodiment.

Generally, there is provided, a method for making a machine learning model more resistant to adversarial examples. Adversarial examples may be specifically crafted modifications to an input of a machine learning model. The adversarial examples cause the machine learning model to misclassify the input and produce an incorrect answer during inference operation. In the method, each input is modified using a randomly generated mask. The randomly generated mask is scaled using a scaling factor and the scaled randomly generated mask is added to the inputs prior to the inputs being provided to the machine learning model. The scaling factor is chosen so that the machine learning model still provides the same correct answer in response to the modified input for valid inputs which are not adversarial examples while also making the model more resistant to inputs that are adversarial examples. In one embodiment, the randomly generated mask may include random noise. Alternately, the randomly generated mask may be an output that results from applying a cryptographic cipher using a fixed key for encrypting the input. In addition, the randomly generated mask may be generated using a pseudo-random number generator where a seed used to generate a random number depends on the input. Also, the seed may be the output of a cryptographic hash function of the input concatenated with some entropy data. In one embodiment, the machine learning model is for classifying images. In another embodiment, the machine learning model may have a different function.

The addition of a mask to each input before providing the inputs to a machine learning model may negate the effect of a perturbation of the input, where the perturbation may have been intentionally added to the input to create an adversarial example. Negating the effect of adversarial examples is especially important in applications where safety, security, and privacy are important. By adding the mask to the input during inference, no re-training of the machine learning model is required.

In accordance with an embodiment, there is provided, a method including: receiving an input; adding a randomly generated mask to the input to produce a modified input; and providing the modified input to the machine learning model, wherein the randomly generated mask is added to the input to negate an effect of a perturbation added to the input, the perturbation resulting in the input being misclassified. The machine learning model may be for image classification, and the randomly generated mask may be added to the input so that the modified input is different from the input by a predetermined scaling factor. Adding the randomly generated mask to the input may further include adding the randomly generated mask so that the modified input is less than a predetermined error difference from the input. Adding the randomly generated mask may further include adding a cryptographic cipher for encrypting the input using a fixed key, wherein the encrypted input, as adjusted by a scaling factor, is used to generate the modified input. The randomly generated mask may be further characterized as being generated using a pseudo-random number generator. The pseudo-random number generator may be based on a seed, the seed depending on a cryptographic hash function of the input, the cryptographic hash function being concatenated with entropy data, and the hash function and entropy data combination may be scaled by a scaling factor before being added to the input. The machine learning model may be trained for classifying images, and wherein the randomly generated mask may change a predetermined number of pixels of the image. The randomly generated mask may further include an output of a cryptographic hash function adjusted by a scaling factor. The randomly generated mask includes a cryptographic function of the input, wherein an output of the cryptographic function of the input may be operated on by a scaling factor to produce a scaled output, and the scaled output may be added to the input to produce the modified input.

In another embodiment, there is provided, a method for making a machine learning model more resistant to adversarial examples, the method including: receiving an input for processing by the machine learning model; adding a randomly generated mask to the input, the randomly generated mask including a scaling factor, the randomly generated mask modifies the input by a predetermined amount determined by the scaling factor to produce a modified input; and providing the modified input to the machine learning model, wherein adding the randomly generated mask to the input is for negating an effect of a perturbation added to the input, the perturbation resulting in the input being classified as an adversarial example. Providing the modified input to the machine learning model may further include providing the modified input to the machine learning model during inference operation of the machine learning model. The randomly generated mask may further include random noise. Adding the randomly generated mask may further include producing the randomly generated mask by encrypting the input using a cryptographic cipher, the cryptographic cipher may be based on a key and the input. Adding the randomly generated mask may further include producing the randomly generated mask using a pseudo-random number generator and a seed, and wherein the seed may depend on the input. The seed may be generated using a cryptographic hash function. The randomly generated mask may further include the scaling factor being a function of the input, and wherein the scaling factor may determine which portions of the input are modified to produce the modified input.

In yet another embodiment, there is provided, a data processing system including: a memory for storing a machine learning model and a mask generator; and a processor coupled to the memory, the processor for implementing the machine learning model and the mask generator, wherein the machine learning model processing an input during inference operation, wherein the mask generator for generating a scaled randomly generated mask, the scaled randomly generated mask for modifying the input to the machine learning model, wherein the scaled randomly generated mask is added to the input for negating an effect of a perturbation of the input, and wherein the perturbation of the input causes the machine learning model to provide a wrong answer in response to the input. The scaled randomly generated mask may include random noise. The scaled randomly generated mask may be produced by encrypting the input using a cryptographic cipher, the cryptographic cipher based on a key. The randomly generated mask may further include a pseudo-random number generator and a seed, and wherein the seed may be generated using a hash function of the input.

FIG. 1 illustrates mask generator 11 and ML model 12 in accordance with an embodiment. Mask generator 11 receives inputs labeled INPUT, modifies the INPUTs, and then the modified inputs are provided to ML model 12. In one embodiment, mask generator 11 modifies each input using a randomly generated mask. The randomly generated mask is added to the INPUT to generate a modified input labeled MODIFIED INPUT. The MODIFIED INPUT is then provided to ML model 12. In one embodiment, the MODIFIED INPUT is for countering input perturbations that may be classified as adversarial examples. The adversarial examples may be input by an attacker to cause the machine learning model to misclassify the input and produce an incorrect answer during inference operation. Machine learning model 12 is a trained ML model and processes the MODIFIED INPUTs and provides an output labeled OUTPUT during inference operation. The inputs to ML model 12 are modified by mask generator 11 so that the intended output of ML model 12 in response to the modified input remains the same as the response would be for the unmodified input while also ensuring that adversarial examples no longer work as the attacker intended.

In one embodiment, mask generator 11 performs the function f(x) which modifies the ML model input x by adding random noise r to the input as $f(x)=x\pm\delta\cdot r$. The amount of random noise added to the input x is determined by a precomputed real scaling factor $\delta$. The scaling factor ensures that a difference between the modified input and the unmodified input is only different enough to prevent ML model 12 from being "fooled" by an adversarial example without causing ML model 12 to provide an incorrect output. The inputs INPUT and MODIFIED INPUT should be sufficiently close to each to ensure this property. A maximum distance between the INPUT and MODIFIED INPUT can be established and checked for each modified input. The scaling factor $\delta$ may be a real value to scale all the values or a matrix to apply a different scaling factor to different parts of the inputs.

In another example, the randomly generated mask is dependent on the INPUT. An input dependent mask r(x) may be instantiated using a cryptographic cipher. The cryptographic cipher C may take as input a key k and an INPUT x and compute a ciphertext c as $c=r(x)=C(k, x)$. The key may be a secret key and may be randomly generated. The cryptographic cipher may be based on any encryption/decryption protocol, such as for example, the Advanced Encryption Standard (AES). The cryptographic cipher is also scaled with the scaling factor, as discussed above, before being added to the INPUT to produce the MODIFIED INPUT as $f(x)=x\pm\delta\cdot r(x)=x\pm\delta\cdot C(k, x)$. So, the resulting MODIFIED INPUT f(x) depends on both the key k and the INPUT x. The input dependent MODIFIED INPUT f(x) is then input to the ML model during inference operation.

Another example of an input-dependent randomly generated mask uses a pseudo-random number generator R(s). A typical example uses the INPUT as a seed s. Hence, a sequence of random numbers may be generated from the INPUT seed. When the same INPUT is again input to the pseudo-random number generator, the same sequence of random numbers is generated. Alternately, the seed is not the INPUT x but is based on the INPUT by using a function H(x). For example, the seed may be the result of a cryptographic hash function $\mathcal{H}$ of the INPUT concatenated with some entropy data $\Delta$ as $H(x)=\mathcal{H}(x\|\Delta)$. The resulting randomly generated mask is then scaled using the scaling factor as $f(x)=x\pm\delta\cdot r(x)=x\pm\delta\cdot R(H(x))=x\pm\delta\cdot R(\mathcal{H}(x\|\Delta))$. As another alternative, instead of letting the INPUT determine the mask values, the scaling factor may also be a function of the INPUT and used to determine which part of the INPUT is modified by using $f(x)=x\pm\delta(x)\cdot r(x)$. For example, in a ML model that classifies images and the INPUT is an image to be classified, the scaling factor may be expressed as a matrix for showing which pixels of the image are modified.

Applying a randomly generated mask to the INPUT before providing the INPUT to ML model 12 may negate the effect of a perturbation of the input, where the perturbation may have been intentionally added to the input to create an adversarial example. Negating the effect of adversarial examples is especially important in applications where safety, security, and privacy are important. By adding the mask to the input, no re-training of the machine learning model is required. In another embodiment, more than one of the above examples may be combined, or used together, to produce a randomly generated mask. Then, the ML output may be based on the result of the combination or by a majority vote.

Figure 2:
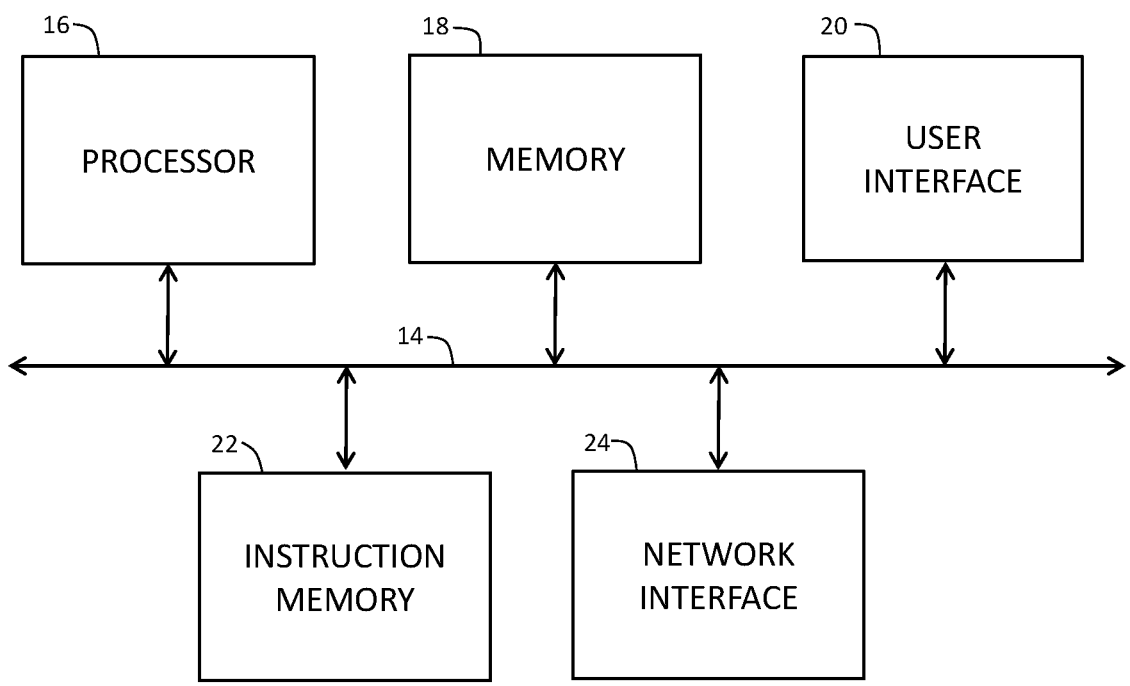
FIG. 2 illustrates a data processing system suitable for implementing the mask generator and machine learning model of FIG. 1.

FIG. 2 illustrates data processing system 10 for implementing the mask generator and machine learning model of FIG. 1. Data processing system 10 may be implemented on one or more integrated circuits and may be used to implement either or both of ML model 12 and mask generator 11. Data processing system 10 includes bus 14. Connected to bus 14 is processor 16, memory 18, user interface 20, instruction memory 22, and network interface 24. Processor 16 may be any hardware device capable of executing instructions stored in memory 18 or instruction memory 22. Processor 16 may be, for example, a microprocessor, field programmable gate array (FPGA), application-specific integrated circuit (ASIC), or similar devices. The processor may be in the secure hardware element and may be tamper resistant. Bus 14 can be any kind of bus and is bi-directionally connected to all the blocks in data processing system 10 for communicating control, data, and address signals.

Memory 18 may be any kind of memory, such as for example, L1, L2, or L3 cache or system memory. Memory 18 may include volatile memory such as static random-access memory (SRAM) or dynamic RAM (DRAM), or may include non-volatile memory such as flash memory, read only memory (ROM), or other volatile or non-volatile memory. Also, memory 18 may be in a secure hardware element.

User interface 20 may be connected to one or more devices for enabling communication with a user such as an administrator. For example, user interface 20 may be enabled for coupling to a display, a mouse, a keyboard, or other input/output device. Network interface 24 may include one or more devices for enabling communication with other hardware devices. For example, network interface 32 may include, or be coupled to, a network interface card (NIC) configured to communicate according to the Ethernet protocol. Also, network interface 32 may implement a TCP/IP stack for communication according to the TCP/IP protocols. Various other hardware or configurations for communicating are available for communicating.

Instruction memory 22 may include one or more machine-readable storage media for storing instructions for execution by processor 16. In other embodiments, memory 22 may also store data upon which processor 16 may operate. Memory 18 and/or memory 22 may store, for example, ML model 12, mask generator 11, or encryption, decryption, or verification applications. Instruction memory 22 may be in the secure hardware element and be tamper resistant.

A memory of data processing system 20, such as memory 18, may be used to store a machine learning model in accordance with an embodiment, where inputs to the machine learning model are modified using a randomly generated mask as described herein. Then if an attacker provides an adversarial example as an input, the adversarial example is modified as describe herein so that the ML model does not provide an incorrect output in response. Data processing system 10, in combination with the mask generator, improve the functionality of a machine learning model by ensuring the correct functionality of the machine learning model as described herein.

FIG. 3 illustrates method 26 for making a machine learning model more resistant to adversarial examples in accordance with an embodiment. Method 26 starts at step 28. At step 28, an input for processing in a ML model is provided. The ML model may be any type of ML model. At step 30, a randomly generated mask is added to the input for the model to produce a modified input. The randomly generated mask may include a scaling factor to determine how much the input is modified by the addition of the randomly generated mask. As discussed above, the goal of the modification is to modify the input just enough to negate an adversarial example without affecting the output of the ML model. At step 32, the modified input is provided to the ML model during an inference operation of the ML model. By modifying each input before providing the input to the ML model, the effect of any adversarial examples provided to the ML model is negated.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   receiving an input;
   adding a scaled randomly generated mask to the input to produce a modified input, wherein the scaled randomly generated mask is generated using a pseudo-random number generator, wherein a seed of the pseudo-random number generator is a cryptographic hash function of a combination of the input concatenated with entropy data to produce the randomly generated mask, wherein an amount the input is modified by the addition of the randomly generated mask is determined by a scaling factor added to the randomly generated mask to produce a scaled randomly generated mask; and
   providing the modified input to a machine learning model, wherein the scaled randomly generated mask is added to the input to negate an effect of a perturbation added to the input, the perturbation resulting in the input being misclassified.

2. The method of claim 1, wherein the machine learning model is for image classification, and the scaled randomly generated mask is added to the input for an inference operation of the machine learning model.

3. The method of claim 1, wherein adding the scaled randomly generated mask to the input further comprises adding the scaled randomly generated mask so that the modified input is less than a predetermined error difference from the input.

4. The method of claim 1, wherein the machine learning model is trained for classifying images, and wherein the scaled randomly generated mask changes a predetermined number of pixels of the image.

5. A method for making a machine learning model more resistant to adversarial examples, the method comprising:
   receiving an input for processing by the machine learning model;
   adding a scaled randomly generated mask to the input to produce a modified input, the scaled randomly generated mask generated using a pseudo-random number generator, wherein a seed of the pseudo-random number generator is generated using a cryptographic hash function of a combination of the input concatenated with entropy data to produce the randomly generated mask, wherein a scaling factor is added to the randomly generated mask to produce the scaled randomly generated mask; and
   providing the modified input to the machine learning model, wherein adding the scaled randomly generated mask to the input is for negating an effect of a perturbation added to the input, the perturbation resulting in the input being classified as an adversarial example.

6. The method of claim 5, wherein providing the modified input to the machine learning model further comprises providing the modified input to the machine learning model during inference operation of the machine learning model.

7. The method of claim 5, wherein the scaled randomly generated mask further comprises random noise.

8. A data processing system comprising:
   a memory for storing a machine learning model and a mask generator; and
   a processor coupled to the memory, the processor for implementing the machine learning model and the mask generator, wherein the machine learning model processing an input during inference operation, wherein the mask generator for generating a scaled randomly generated mask, the scaled randomly generated mask comprising a pseudo-random number generator and a seed, wherein the seed is a cryptographic hash function of a combination of the input concatenated with entropy data to produce the randomly generated mask, wherein an amount the input is modified by the addition of the randomly generated mask is determined by a scaling factor added to the randomly generated mask to produce the scaled randomly generated mask, wherein the scaled randomly generated mask is added to the input for negating an effect of a perturbation of the input, and wherein the perturbation of the input causes the machine learning model to provide a wrong answer in response to the input.

9. The data processing system of claim 8, wherein the scaled randomly generated mask comprises random noise.

* * * * *